UNITED STATES PATENT OFFICE.

ABEL PECK, OF NEWBURG, NEW YORK.

ART OF PRODUCING PHOTOGRAPHIC NEGATIVES.

SPECIFICATION forming part of Letters Patent No. 252,964, dated January 31, 1882.

Application filed February 17, 1881. (No specimens.)

*To all whom it may concern:*

Be it known that I, ABEL PECK, of the city of Newburg, Orange county, State of New York, have invented certain Improvements in the Art of Making Photographic Negatives, of which the following is a specification.

To enable others skilled in the art or science to which my invention appertains to work the same, I will describe it as follows:

My invention relates to the process of producing film or gelatine negatives to be used in printing by the rays of the sun photographic pictures therefrom. By my process the film or gelatine negatives may represent what is known in photography as "backgrounds" for a picture, or the scene itself in a picture, or both the background and the scene may be represented on one and the same film or gelatine negative.

I take a piece of glass as commonly used at the present time for photographic negatives, and I coat one side of the glass with a thin coating or covering of beeswax dissolved in benzine. I then flow upon it a coating of collodion or any other sensitized substance over the beeswax. The glass thus coated (if with collodion) is plunged into a solution of nitrate of silver in the usual manner now well known in the art of photography. If the carbon or dry plate is used, the silver solution or bath may be omitted. I proceed to take a negative with the camera upon this glass plate in the ordinary manner of taking pictures. If I desire to produce a film or gelatine negative which will represent only a background for a picture, I place before the camera such scenery as will give such an impression on the glass, or if the film or gelatine negative is to represent a complete scene—as, for instance, a background and the likeness of a person—then I place before the camera the person and the background complete, or if a person's likeness alone is to be made then no background scenery will be placed before the camera. In this way I produce upon the glass the picture or scene complete, whether it be a background or a person's likeness, or copy of some other picture. This forms no part of my invention, as it is well known and a common practice in the art. I proceed with my glass negative in the ordinary manner and develop and fix it. I then submerge the glass negative in a dish of water with the collodion or face side uppermost and sufficient water to well cover the glass. I place upon the water a sheet of gelatine or any other translucent or transparent substance having substantially the same qualities as gelatine, of the proper size. In a few moments the water will soak and saturate the gelatine and cause it to expand; and finally it will sink by its weight and settle down upon the collodion or face side of the glass negative. I then take them both out of the water together, and whatever air or water may be between the gelatine or film and the glass negative is expelled by slight pressure upon the gelatine, using a soft brush or any other suitable article which will not injure the gelatine. I then place the glass negative, with the gelatine upon it, in a pressure-frame of any description which will answer the purpose of applying an even pressure upon the edges of the gelatine. By this means the gelatine takes up from the glass the scene or picture which had been taken thereon in the camera. The beeswax which was first applied to the glass prevents the gelatine from adhering to the glass. I leave the glass and gelatine or film under this pressure until the gelatine is dry, which will depend largely upon the size and thickness of the gelatine or film. When the pressure is removed the gelatine will be the negative, and the glass will be perfectly clean and clear, and then the gelatine or film negative is varnished and retouched with a pencil where necessary, and the gelatine or film negative is ready for use in printing photographic pictures in precisely the same manner as glass negatives are now used by the rays of the sun.

These gelatine or film negatives have a great advantage over glass negatives, because I can print from either or both sides of my gelatine or film negatives. The glass can serve a great many times for the same purpose, as just described, and in making my film or gelatine negatives I do not employ the rays of the sun.

By my process very cheap and durable film or gelatine negatives can be produced, and the space required to keep large quantities of them will be merely nominal, besides, for purposes of transportion and moving, they will be found to far excel glass negatives.

By this process photographers can be supplied with very elegant and inexpensive background-negatives and of a great variety, while if the painted scenery for such backgrounds, or the necessary furniture or articles to make up such backgrounds, had to be on hand at the gallery or bought by each individual photographer it would involve such an expense or require so much room as to make it impossible for the photograher to produce such backgrounds on his finished pictures or photographs as my process will enable him to do.

Having described my invention, I claim as new and desire to secure by Letters Patent—

In the art of producing film negatives, the herein-described process of submerging a properly-prepared glass negative, coated side uppermost, in a shallow dish or pan of water and floating upon the water a sheet of gelatine or its equivalent until it becomes saturated, sinks, and adheres to the glass plate, after which it is dried under pressure and finally removed from the glass plate, substantially as set forth.

ABEL PECK.

Witnesses:
NELSON CRIST,
L. C. BODINE.